United States Patent
Dillard et al.

(10) Patent No.: US 10,311,407 B1
(45) Date of Patent: Jun. 4, 2019

(54) SYMBOL-BASED COMMUNICATION ROUTING

(71) Applicant: STATE FARM MUTUAL AUTOMOBILE INSURANCE COMPANY, Bloomington, IL (US)

(72) Inventors: John M. Dillard, Bloomington, IL (US); William Richard Simonovich, II, Clinton, IL (US); John Jenkins, Bloomington, IL (US); Chadd Eugene Grove, Bloomington, IL (US); Kimberly J. Timmons, Bloomington, IL (US); Christy L. Conn, Leroy, IL (US); Kannan Balakrishnan, Hoffman Estates, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 142 days.

(21) Appl. No.: 14/528,899

(22) Filed: Oct. 30, 2014

(51) Int. Cl.
| G06Q 40/00 | (2012.01) |
| G06Q 10/10 | (2012.01) |
| H04L 12/761 | (2013.01) |
| H04L 29/08 | (2006.01) |
| G06F 16/00 | (2019.01) |

(52) U.S. Cl.
CPC ........... G06Q 10/107 (2013.01); G06F 16/00 (2019.01); H04L 45/16 (2013.01); H04L 67/02 (2013.01)

(58) Field of Classification Search
CPC .... H03M 7/4006; H04L 45/742; H04L 45/00; G06Q 10/107
See application file for complete search history.

(56) References Cited

U.S. PATENT DOCUMENTS

| 5,095,480 A * | 3/1992 | Fenner | ................ H03M 7/4006 340/2.4 |
| 5,227,893 A * | 7/1993 | Ett | ..................... H04N 1/32128 358/1.9 |

(Continued)

OTHER PUBLICATIONS

Panasonic ("Operating Instructions: Model KX-FHD331" 2002).*

(Continued)

*Primary Examiner* — Bruce I Ebersman
*Assistant Examiner* — Mark H Gaw
(74) *Attorney, Agent, or Firm* — Marshall, Gerstein & Borun LLP; Randall G. Rueth

(57) ABSTRACT

A method includes receiving an indication that a communication is to be sent from the first party to a second party, and, for the communication from the first party to the second party, generating a code that encodes an indication of a communication routing between the first party and the second party. The computer-implemented method further includes embedding the code into the communication such that the code is sent with the communication from the first party to the second party, receiving a response to the communication, wherein the response to the communication includes the embedded code, and decoding the embedded code to determine the communication routing between the first party and the second party. Still further, the computer-implemented method includes causing the response to the communication to be routed to the first party based on the determined communication routing.

5 Claims, 12 Drawing Sheets

(56) References Cited

U.S. PATENT DOCUMENTS

| | | | |
|---|---|---|---|
| 7,013,298 B1* | 3/2006 | De La Huerga | G06F 17/22 |
| 2003/0065629 A1* | 4/2003 | Hill | B07C 3/00 |
| | | | 705/401 |
| 2008/0016168 A1* | 1/2008 | Noonan | G06Q 10/107 |
| | | | 709/206 |
| 2010/0293106 A1* | 11/2010 | Rhoads | G06Q 10/083 |
| | | | 705/330 |

OTHER PUBLICATIONS

American Swimming Coaches Association ("Coaches Certification Purpose and the Process" American Swimming Coaches Association http://www.usaswimming.org/_Rainbow/Documents/04d7e5f5-1bf0-4727-8679-13fa74e87b03/ASCA%20Certification%20Application.pdf Oct. 1, 2011).*

VIA ("VIA helps clients communicate with their customers and prospects through a variety of mailing, email and fulfillment programs" VIA http://vianj.com/communicate-with-clients-and-prospects.cfm Feb. 2, 2011).*

Gianfagna, Jean "To BRC or Not to BRC? The New Direct Mail Strategy Question" www.gianfagnamarketing.com http://www.gianfagnamarketing.com/blog/2011/04/21/to-brc-or-not-to-brc-the-new-direct-mail-strategy-question/ Apr. 21, 2011 ).*

Insurance & Technology ("Using Barcodes to Improve Insurance Processes" Insurance & Technology http://www.insurancetech.com/whitepaper/vendor/43800010 Jun. 2008).*

Chambers, Richard ("Letter: PBAOB Rulemaking Docket Matter No. 028" IIA https://na.theiia.org/standards-guidance/Public%20Documents/PCAOB_Confirmations_August_2010_and_Attachment1.pdf Sep. 7, 2010).*

Sagehill Enterprises ("Inserting external HTML code" Sagehill Enterprises <http://www.sagehill.net/docbookxsl/InsertExtHtml.html Jan. 8, 2007).*

Neodynamic SRL ("How to create HTML emails featuring barcode images with System.Net.Mail classes in ASP.NET (VB.NET and C#)" Neodynamic SRL http://www.neodynamic.com/ND/FaqsTipsTricks.aspx?tabid=66&prodid=1&sid=74 Apr. 23, 2007).*

Panasonic ("Operating Instructions: Model KX-FHD331" 2002). (Year: 2002).*

* cited by examiner

SYMBOL-BASED COMMUNICATION ROUTING

TECHNICAL FIELD

The present disclosure generally relates to routing communications, such as emails and letters, and, more particularly, to routing communications based on embedded symbols within the communications.

BACKGROUND

Customers of a company, such as an insurance company, often need to ask questions about products or services, such as insurance claims corresponding to an insurance policy, to certain employees of the company via email. Typically, customers also need to send information, such as completed forms, to companies in the physical mail. Such inbound communications have to be routed by the company to appropriate employees, such as insurance agents or claim handlers, and/or labeled with the correct document categories.

Automatic techniques for routing inbound or incoming communications attempt to make the routing process efficient and to reduce human intervention, which can be expensive and less consistent. However, current automatic routing solutions often do not route communications correctly and/or fail to route certain communications. In the case of emails, current automatic routing solutions rely on customers to properly format subject lines of emails, which reliance produces varied results. Moreover, paper mail routing often entails high levels of human interaction to research and validate associations of inbound paper documents with certain employees or departments of a company.

SUMMARY

In one embodiment, a computer-implemented method comprises receiving, from a first party via a computer network, an indication that a communication is to be sent from the first party to a second party, and, for the communication from the first party to the second party, generating, by one or more processors, a code that encodes an indication of a communication routing between the first party and the second party. The computer-implemented method further includes embedding, by the one or more processors, the code into the communication such that the code is sent with the communication from the first party to the second party, receiving, from the second party via a computer network, a response to the communication, wherein the response to the communication includes the embedded code indicating the communication routing between the first party and the second party, and decoding, by the one or more processors, the embedded code to determine the communication routing between the first party and the second party. Still further, the computer-implemented method includes causing, by the one or more processors, the response to the communication to be routed to the first party based on the determined communication routing.

In another embodiment, a computer device comprises one or more processors and one or more non-transitory memories coupled to the one or more processors. The one or more non-transitory memories include computer executable instructions stored therein that, when executed by the one or more processors, cause the one or more processors to receive, from a first party via a computer network, an indication that a communication is to be sent from the first party to a second party, and, for the communication from the first party to the second party, generate a code that encodes an indication of a communication routing between the first party and the second party. The computer executable instructions further cause the one or more processors to embed the code into the communication such that the code is sent with the communication from the first party to the second party, receive, from the second party via a computer network, a response to the communication, wherein the response to the communication includes the embedded code indicating the communication routing between the first party and the second party, and decode the embedded code to determine the communication routing between the first party and the second party. Still further, the computer executable instructions cause the one or more processors to cause the response to the communication to be routed to the first party based on the determined communication routing.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such terms should not be interpreted to be limited in scope based on any statement made in any section of this patent (other than the language of the claims). To the extent that any term recited in the claims at the end of this patent is referred to in this patent in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

System Overview

Figure 1:
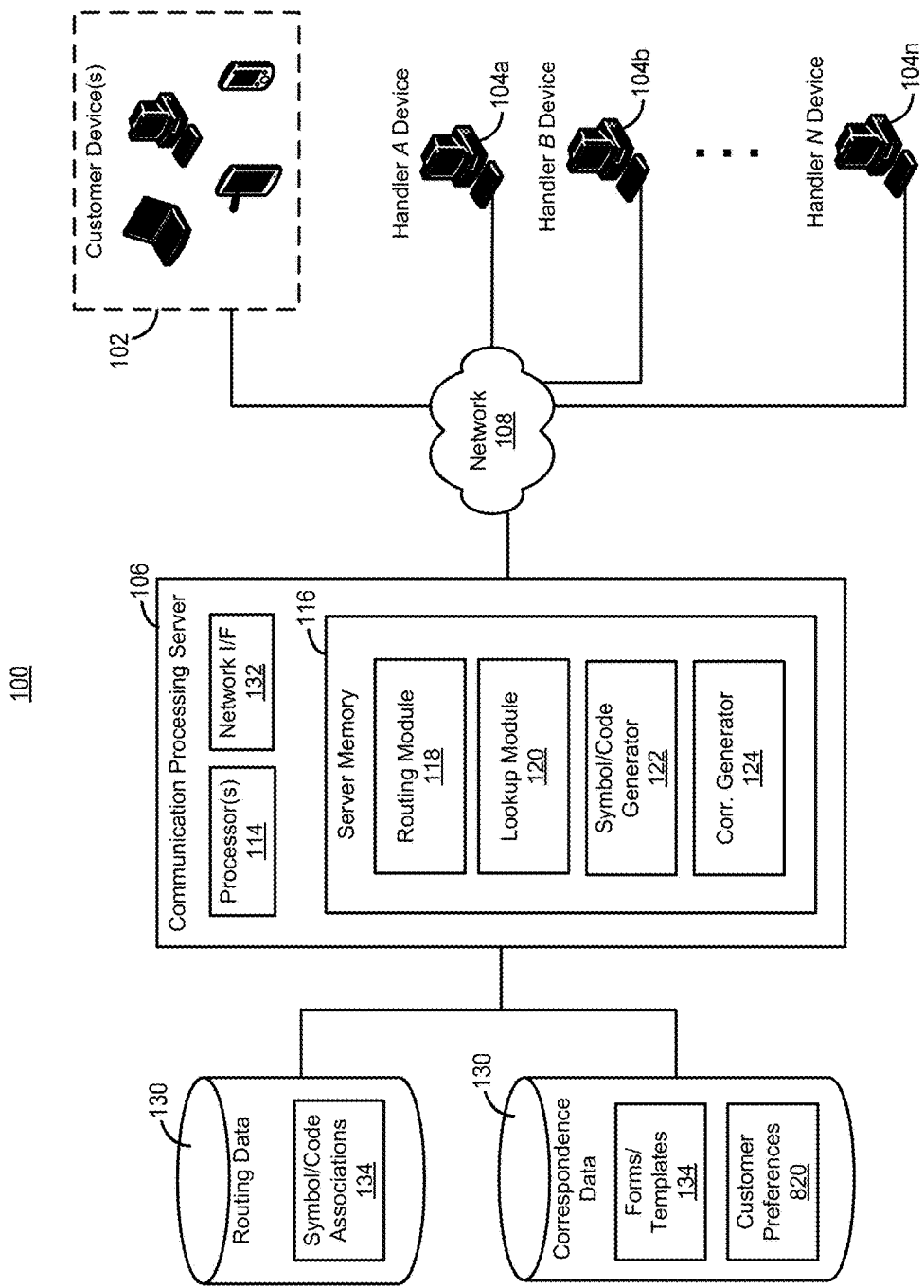
FIG. 1 illustrates an example computing environment for routing communications based on embedded symbols or codes.

FIG. 1 illustrates an example computing environment 100 for symbol-based communication routing. The example computing environment 100 includes one or more customer devices 102, one or more handler devices 104a-104n corresponding to one or more handlers ("Handler A-Handler N"), and a communication processing server 106. In an implementation, the communication processing server 106 may route communications, such as emails, physical mail, faxes, text messages, mobile alerts, messages accessible via a web browsing application, etc., between the customer devices 102 and particular ones of the handler devices 104a-104n based on symbols or codes embedded in or on the communications. In this manner, the communication processing server 106 may reduce the time between receiving a communication and delivering the communication to an appropriate party.

Companies, such as insurance, healthcare, real estate, etc. companies, or other entities, such as government agencies, non-profit organizations, etc., may utilize the computing environment 100 to efficiently route communications and reduce the overall time it takes to resolve conflicts, complete purchases, or complete other interactions with customers. For example, an insurance company may utilize the computing environment 100 to efficiently route communications to appropriate departments or divisions, such as claims, payments, etc., within the insurance company, thereby reducing the average time to complete an insurance claim process. In another example, a government agency may utilize the computing environment 100 to efficiently route communications to appropriate individuals, such as officers, judges, accountants, etc., and thereby reduce the average time needed to process traffic violations. Generally, any entity may utilize the computing environment 100 to improve the efficiency of routing communications between a variety of departments, divisions, individuals, devices, etc. and customers or clients. For ease of discussion, the following description will utilize many examples referencing an insurance company, such as an insurance company providing home, auto, etc. policies to customers, but it is understood that any suitable company, organization, etc. may utilize the techniques described herein.

The customer device(s) 102 and/or the handler devices 104a-104n may include any suitable mobile or stationary computing devices such as smartphones, tablet computers, laptop computers, desktop computers, personal digital assistants, smartwatches, head-mounted computing devices, etc. An operator of the customer device(s) 102 may correspond to a customer or client of a company, which company utilizes the computing environment 100 to efficiently route communications. For example, an operator of the customer device(s) 102 may be a customer of an insurance company who may send various communications to the communication processing server 106 (e.g., via a network 108). In such a case, the communication processing server 106 may route the various communications to appropriate parties (e.g., certain insurance agents or claim handlers) within the insurance company.

Operators ("Handler A-Handler N") operating the handler devices 104a-104n may include one or more employees of a company, which company utilizes the computing environment 100 to efficiently route communications. In the example above of the insurance company, each of the Handlers A-N may be an agent, claims adjuster, accountant, member of a payments or disbursements department, customer service agent, etc. Generally, operators of the handler devices 104a-104n may be any employees, consultants, or individuals associated with a company or organization, such as information technology (IT) professionals, sales people, business managers, accountants, etc. The communications processing server 106 may embed symbols in communications from these individuals to an operator of the customer devices 102 (e.g., a "customer"), and vice versa. Further, when the communications processing server 106 receives responses from the customer devices including the embedded symbols, the communications processing server 106 may decode the embedded symbols to route each of the responses to specific ones of the handler devices 104a-104n.

The customer device(s) 102 and the handler devices 104a-104n may communicate with the communication processing server 106 via the network 108. The network 108 may be a proprietary network, a secure public Internet, a virtual private network or some other type of network, such as dedicated access lines, plain ordinary telephone lines, satellite links, combinations of these, etc. Where the network 108 comprises the Internet, data communication may take place over the network 108 via an Internet communication protocol. The network 108 may communicate with the customer device(s) 102 and the handler devices 104a-104n through wireless or wired connections. Further, in some examples, the network 108 is a mobile (or cellular) communication network.

The communication processing server 106 may include one or more central processing units (CPUs) or processors 114 (may be called a microcontroller or a microprocessor), one or more memories 116, and a system bus (not shown) that couples various system components including the memory 116 to the processors 114. The system bus may include an Industry Standard Architecture (ISA) bus, a Micro Channel Architecture (MCA) bus, Enhanced ISA (EISA) bus, Video Electronics Standards Association (VESA) local bus, a Peripheral Component Interconnect (PCI) bus or a Mezzanine bus, and the Peripheral Component Interconnect Express (PCI-E) bus.

The memory 116 may include an assortment of computer-readable media, where computer-readable media may be any media that may be accessed by the communication processing server 106. By way of example, and not limitation, the media may include both transitory and non-transitory media, removable and non-removable media. For example, the memory 116 may include non-transitory media such as RAM, ROM, EEPROM, or other memory technology, optical storage disks, magnetic storage devices, and any other non-transitory medium which may be used to store computer-accessible information. In particular, the memory 116 may store one or more applications or modules including a routing module 118, a lookup module 120, a symbol/code generator 122, and a correspondence generator 124. Although each of the modules or applications 118, 120, 122, and 124 are illustrated as separate modules or applications stored in the memory 116, some implementations of the environment 100 may combine and/or separate the functionality of the modules or applications 118, 120, 122, and 124 into any number of distinct modules, applications, etc.

The symbol/code generator 122 may, when executed by the processors 114, generate symbols, codes, content for hidden Hypertext Markup Language (HTML) fields, etc. to embed in communications between the customer devices 102 and the handler devices 104a-104n. In particular, the symbol/code generator 122 may generate symbols or codes such that, when a communication is received from the customer devices 102 with the symbols or codes, the communication processing server 106 may determine an appropriate routing for the communication (e.g., to a particular one of the "Handlers A-N" or particular one of the handler devices 104a-104n).

The symbols or codes generated by the symbol/code generator 122 may include any number and combination of suitable visual symbols, textual symbols, or other symbology expressing or encoding data related to the routing of communications. For example, a symbol or code generated by the symbol/code generator 122 may include a one or two dimensional bar code (QR Code® matrix barcode, PDF417® stacked linear barcode, Maxicode, Microsoft® tag, etc.), a unique filename or other sequence of characters, codes in hidden HTML fields, etc. or a combination of these symbols or codes. Although QR Code® matrix barcodes and PDF417® stacked linear barcodes are utilized by way of example in the following disclosure, the symbol/code generator 122 and/or other devices implementing techniques discussed herein may utilize any suitable visual and/or non-visual (e.g., numeric or textual) symbols or codes and/or combinations of these symbols or codes. These symbols or codes may generally encode any information, such as departments within companies, identification of particular ones of the "Handlers A-N," ticket numbers, insurance claim numbers, etc., that the communication processing server 106 may utilize to route communications between the customer device(s) 102 and the handler devices 104a-104n.

In some implementations, symbols or codes generated by the symbol/code generator 122 may encode indices into a plurality of symbol/code association data 128 stored in a routing database 130. That is, when decoded, the symbols or codes generated by the symbol/code generator 122 may indicate numbers, or other strings of characters or symbols, which numbers can be used by the communication processing server 106 to "lookup" data within the routing database 130 (e.g., via execution of the lookup module 120). The symbol/code generator 122 may generate symbols or codes that refer (i.e., point to) sensitive information (e.g., insurance claim numbers, names, or financial information) stored in the symbol/code association data 128 without directly revealing the sensitive information in the generated symbols or codes. The symbols or codes may act as keys allowing the communication processing server 106 to retrieve data related to communication routing, without actually encoding the data related to communication routing.

The correspondence generator 124 may, when executed by the one or more processors 114, generate correspondence in which symbols or codes (e.g., generated by the symbol/code generator 122) are embedded. In some implementations, the correspondence generator 124 may utilize various forms, or other correspondence templates, to generate correspondence. For example, when prompted by one of the handler devices 104a-104n, the correspondence generator 124 may retrieve a form from the forms/templates 132 in the correspondence database 134. The form may include one or more "blank" spaces, fields, etc. that may be completed (e.g., filled with textual content) via interactions with the handler devices 104a-104n (e.g., via a web browser, email client, or other suitable interface). In one scenario, when prompted by the handler device 104a via interactions with an email client application executing on the handler device 104a, the correspondence generator 124 may retrieve an insurance form letter template from the form/templates 132. The correspondence generator 123 may allow an operator of the handler device 104a to complete, modify, sign, or add text to the insurance form letter before sending the form letter to an insurance customer. Although shown as implemented by the communication processing server 106 in FIG. 1, it is understood that certain functionality of the correspondence generator 124, such as generating forms or letters based on templates, may be implemented on one or more of the handler devices 104a-104n while other functionality, such as embedding symbols and codes in correspondence, may be implemented on the communication processing server 106.

In some implementations, the customer device(s) 102 may interact with the correspondence generator 124 to generate communications to be sent to the handler devices 104a-104n. In one scenario, an insurance customer operating the customer device(s) 102 may interact with the correspondence generator 124 to generate a communication to one of the handler devices 104a-104n to start an insurance claim process. Such interactions may occur via a web interface, which web interface is navigated to by the customer device(s) within a web browser application. Further, in some implementations, the correspondence generator 124 may utilize one or more templates or forms stored in the forms/templates 132 when generating communications from operators of the customer device(s) 102 to the handler devices 104a-104n.

The correspondence generator 124 may automatically generate communications to operators of the customer device(s) 102 or operators of the handler devices 104a-104n, in some implementations. For example, at periodic times or at any suitable pre-defined or dynamically determined times, the correspondence generator 124 may generate communications using the forms/templates 132 to send to customers or handlers. In one scenario, the correspondence generator 124 may utilize form letter templates to automatically send insurance customers (e.g., operating the customer device(s) 102) reminders about renewing policies, making payments, etc. Such communications may be automatically generated by the correspondence generator 124 without, or with substantially minimal, interactions from operators of the customer device(s) 102 or operators of the handler devices 104a-104n.

In any event, the correspondence generator 124 may generate communications, such as email communications, paper communications, faxes, etc., and embed symbols or codes (e.g., generated by the symbol/code generator 122) into the communications. The correspondence generator 124 may prompt the symbol/code generator 122 to generate a symbol specifically corresponding to a certain communication or communication routing, and, when receiving the generated symbol from the symbol/code generator 122, the correspondence generator 124 may embed the symbol. To embed symbols/codes, the correspondence generator 124 may insert an image of the symbol/code (e.g., a QR Code® or PDF417® barcode) on or in communications, such as in rich text format emails, for example. In other cases, the correspondence generator 124 may embed symbols or codes within hidden or obscured portions of communications, such as in hidden HTML fields or file names for electronic communications or in watermarks or magnetic/metallic strips for paper communications.

The routing module 118, when executed by the processors 114, may: (i) receive communications including embedded symbols or codes or receive indications of those symbols or codes; (ii) decode the embedded symbols or codes to determine appropriate routing information for the received communications; and (iii) cause the received communications to be routed according to the determined routing information. The routing module 118 may directly receive electronic communications (e.g., emails or faxes) via an email/fax application (not shown) executing on the communication processing server 106 or another server. Alternatively or additionally, the routing module 118 may receive scanned, or otherwise electronically read, communications or embedded symbols in/on those communications. For example, the routing module 118 may receive a scanned version of a letter, which letter includes a QR Code®, or the routing module 118 may receive an email in which a QR Code® is embedded (e.g., via a rich text format). The routing module 118 may utilize any suitable routines to decode symbols/codes in or on communications, such as QR Code® readers, PDF417® barcode readers, proprietary decoding algorithms, HTML parsing algorithms, etc. The routing module 118 may also cooperate with the lookup module 120 to lookup information associated with symbols/codes in the routing database 130.

Upon decoding symbols/codes embedded in communications, the routing module 118 may cause communications to be routed to appropriate parties. For example, the routing module 118 may determine that a symbol/code embedded in an email from an insurance customer indicates an insurance claim number. As such, the routing module 118 may forward the email from the customer directly to an claim handler handling that insurance claim. In another example, the routing module 118 may determine that a symbol/code embedded in a scanned paper communication from an insurance customer indicates that the paper communication is related to a payment for an insurance policy. As such, the routing module 118 may forward the scanned paper communication or prompt a forwarding of the paper communication itself (as discussed further with reference to FIG. 2) to a department of an insurance company handling policy payments.

Generally, the routing database 130 and the correspondence database 134 may include data stored and queried via any suitable data structure, format, protocols, languages, etc. For example, the routing database 130 and the correspondence database 134 may include structured data, semi-structured data, or unstructured data stored in relational databases, object-relational databases, hierarchical databases, document-oriented databases, etc. The communication processing server 106 may query, scan, or otherwise interact with the routing database 130 and the correspondence database 134 via languages, protocols, scripts, etc. defined according to database servers, applications, or systems such as the DB2® Database Software, Apache™ Hadoop® Software Framework, SQL Server® Relational Database Management System, Oracle® Database Object-Relational Database Management System, MongoDB® Document-Oriented Database System, etc.

Although one communication processing server 106 and two databases 130 and 134 are depicted in FIG. 1, some implementations of computing environments for symbol-based communications routing may utilize different numbers of servers and data storage devices. In particular, the processing performed by the communication processing server 106 may be distributed among a plurality of servers in an arrangement known as "cloud computing," and the data stored in the databases 130 and 134 may be distributed among a plurality of data storage devices, in an embodiment. This configuration may provide several advantages, such as, for example, enabling near real-time uploads and downloads of information as well as periodic uploads and downloads of information.

Figure 2:
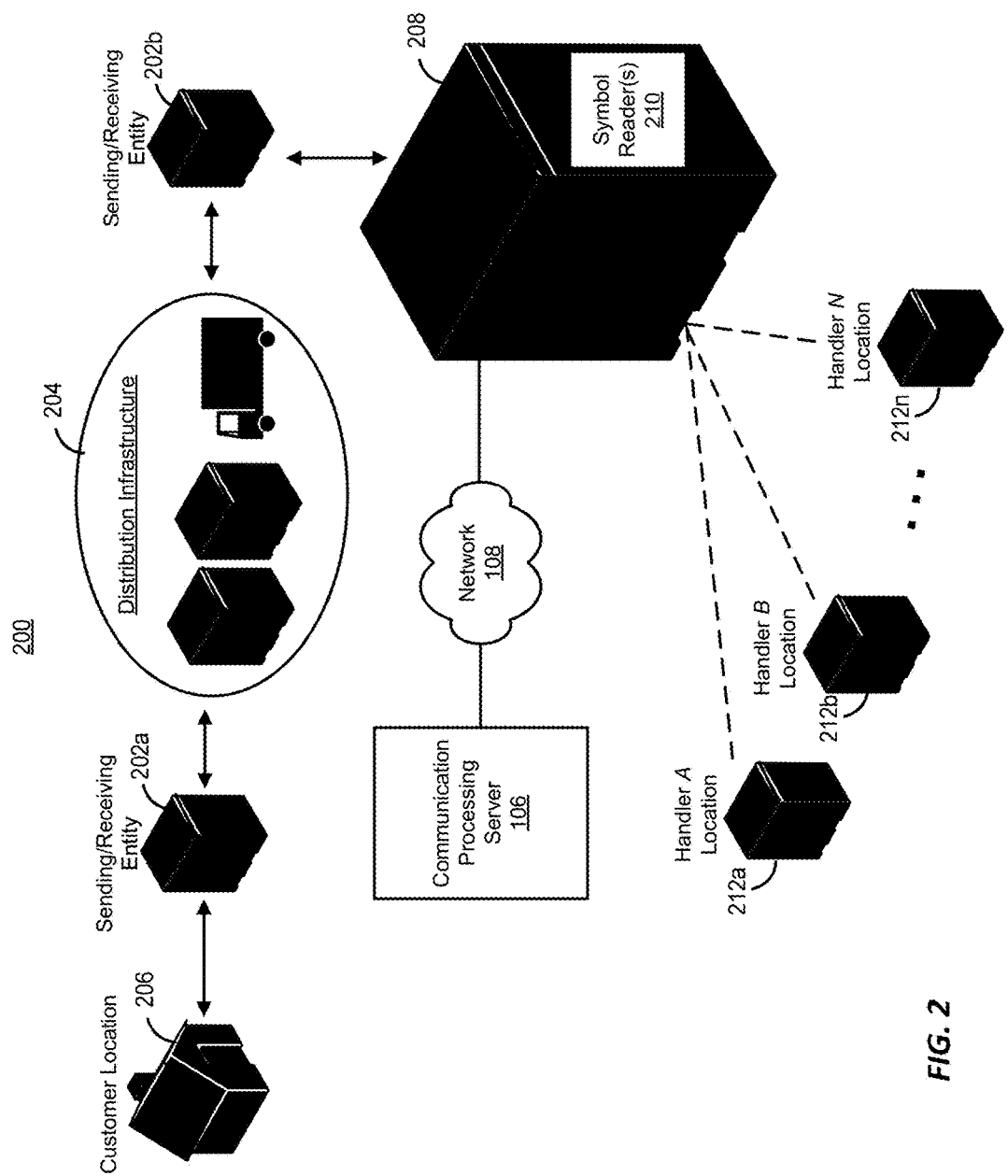
FIG. 2 illustrates an example mail processing system which may operate in cooperation with the example computing environment illustrated in FIG. 1.

Systems implementing the methods for symbol-based communications routing, as described herein, may utilize computing environments similar to the environment 100 in any suitable combination with physical mail/parcel processing systems, such as an example mail processing system 200 illustrated in FIG. 2, in some implementations.

The example mail processing system 200 includes one or more sending/receiving entities 202*a* and 202*b* such as post offices or companies responsible for mail/parcel services and a distribution infrastructure 204 facilitating the movement and processing of mail between the sending/receiving entities 202*a* and 202*b*. The distribution infrastructure 204 may include any number of mail or package processing centers, warehouses, vehicles (e.g., airplanes, trains, and trucks), etc. utilized by postal services or shipment and logistics companies to transfer letters, packages, etc. between the sending/receiving entities 202*a* and 202*b*.

In a scenario, a customer (e.g., of an insurance company) may send a physical communication (e.g., a letter) from a customer location 206 to a communication processing center 208. The customer location 206 may be a home of the customer and the communication processing center 208 may be one of a plurality of correspondence addresses of a company. An insurance customer may send a completed claim form via mail from the customer location 206 (e.g., the home of the customer) to the communication processing center 208 corresponding to a corporate address of the insurance company, for example. Generally correspondence sent between the customer location 206 and the communication processing center 208 may include any number of letters, forms, postcards, packages, envelopes, etc. processed by the sending/receiving entities 202*a* and 202*b* and the distribution infrastructure 204.

One or more symbol readers 210 may be located at the communication distribution center 208. The symbol readers 210 may be configured to scan, or otherwise read or capture, symbols or codes on incoming correspondence (e.g., letters) from the customer location 206, such as symbols or codes generated and embedded by the communication processing server 106. The symbol readers 210 may include document scanners, copy/scan/fax machines, etc.

In some implementations, the symbol readers 210 or computing devices communicatively connected to the symbol readers 210 may transmit scanned images or other indications of symbols or codes on incoming physical correspondence to the communication processing server 106 (e.g., via the network 108). Subsequently, the communication processing server 106 may decode the symbols or codes on incoming correspondence. Also, the communication processing server 106 may: (i) transmit scanned, or other electronic, versions of the correspondence to certain of the handler devices 104a-104n based on routing information encoded in the symbols or codes; and/or (ii) cause the incoming physical correspondence to be physically routed (e.g., forwarded from the communication processing center 208) to one or more locations of handlers 212a-212n. To cause physical mail to be forwarded to the locations of handlers 212a-212n, the communication processing server 106 may send control signals to mail sorting machines (not shown), communications (e.g., emails) to mail sorting departments of a company, update entries in one or more databases indicating destinations for the incoming correspondence, or complete any suitable interactions with other computing devices or human operators to indicate routing destinations for each piece of incoming mail.

The locations of the handlers 212a-212n may be certain locations within the communication processing center 208, separate buildings or offices on a same campus as the communication processing center 208, or separate buildings or offices in physical locations different from the physical location of the communication processing center 208. For example, the locations of the handlers 212a-212n may correspond to portions of a building and/or separate buildings that house different departments of a company, or the locations of the handlers 212a-212n may correspond to separate individual offices of employees of a company. In any event, based on routing information embedded on incoming physical correspondence, the communication processing server 106 may cause a piece of physical incoming mail to be forward to a specific one of the locations of the handlers 212a-212n based on symbols or codes on the piece of physical incoming mail.

Generally, the techniques of the present disclosure may be applied to correspondence of multiple dissimilar types including electronic correspondence and physical correspondence. Physical letters, emails, faxes, text messages, messages displayed in website interfaces, etc. may be exchanged between a customer and a number of handlers. The communication processing server 106 may efficiently route all of these dissimilar types of communication to appropriate parties (e.g., specific handlers) based on symbols or codes embedded in or on the communications. A system and/or computing environment implementing the techniques described herein may include any suitable combination of the components of the computing environment 100 and the mail processing system 200, along with other components not depicted in FIG. 1 or 2, such as fax machines, copy machines, etc.

Routing Communications

FIGS. 3A, 3B, 4, 5A, 5B, and 6 illustrate example scenarios in which a communication processing server 300 routes communications between particular ones of a plurality of handlers 302a-302n and a customer 304. The communication processing server 300 may be the communication processing server 106, in an implementation. For ease of discussion, electronic communications, such as emails, are primarily discussed with reference to FIGS. 3A, 3B, 4, 5A, 5B, and 6. However, substantially similar scenarios may include the routing of physical mail, faxes, etc. Although just referred to as "Handlers" or the "Customer," the plurality of handlers 302a-302n and the customer 304 may utilize any number of computing devices to accomplish the task described below.

Figure 3A:
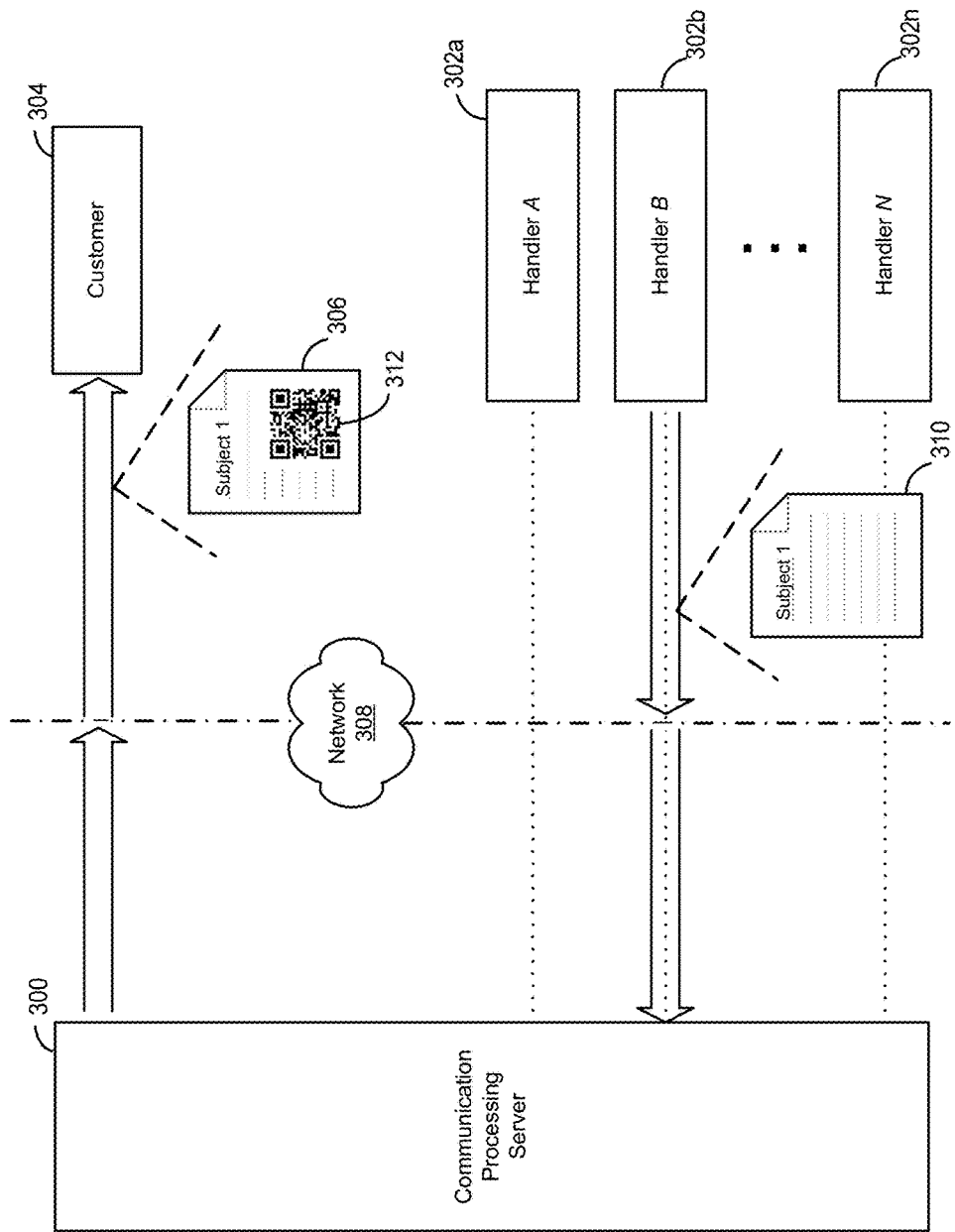
FIGS. 3A and 3B illustrate a scenario in which a communication generated by a handler is routed between a customer and the handler.

Specifically referring to FIG. 3A, a handler 302b may interact with the communication processing server 300 to generate an email 306 that is sent to the customer 304. For example, the handler 302b may be an insurance agent or claim handler that is sending one or more forms, letters, bills, etc. to a customer of the insurance company via email. The handler 302b may interact with a correspondence generator, such as the correspondence generator 124, of the communication processing server 300 via the network 308. Interactions may include accessing web pages generated by the communication processing server 300, sending messages to the communication processing server 300 via an email client application (e.g., Microsoft Outlook® email and calendar software or Mozilla Thunderbird® email application), etc. In any event, the handler 302b may communicate or indicate content 310 to be included in the mail 306 to the customer 304.

Upon receiving the content 310, or at least indications of the content 310, the communication processing server 300 may generate one or more symbols or codes to be embedded in the email 306. For example, the communication processing server 300 may execute a symbol generator, such as the symbol/code generator 122, to generate one or more QR Codes®. The generated symbols or codes 312 encode data that will allow any response message, forwarded message, physical mail reply, etc. also including the generated symbols or codes 312 to be routed by the communication processing server 300 to an appropriate one of the handlers 302a-302b. If the handler 302b originating the message is an insurance claim handler requesting claim information from the customer 304, the communication processing server may encode an indication of the handler 302b, a department of the insurance company corresponding to the handler 302b, a claim number corresponding to the requested claim information, etc. into the generated symbols or codes 312. Alternatively, the symbols or codes 312 may encode indices into a database where similar information is stored.

Once the symbols or codes 312 are generated, the communication processing server 300 embeds the codes in the email 305 to be sent to the customer 304. To embed the symbols or codes, the communication processing server 300 may include the symbols or codes 312 as images in an HTML or rich text format, include the symbols or codes in hidden HTML fields in an HTML format, attach the symbols or codes 312 as an attachment to the email 306, include alphanumeric representations of the symbols or codes in a subject line of the email 306, etc.

The email 306 including the embedded symbols or codes 312 is sent to the customer 304. In some cases, the communication processing server 300 sends the email 306 to the customer 304 via the network 308, and, in other cases, the communication processing server 300 may forward the email 306 to another server or computing device (not shown), such as an outgoing email server utilizing the Simple Mail Transfer Protocol (SMTP), to send the email 306 to the customer 304. In still other implementations, the communication processing server 300 may return a copy of the email 306 with the embedded symbols or codes 312 to the handler 302b, which handler 302b may forward the email 306 to the customer 304 via the network 308 and any suitable number of email servers, email applications, etc.

Figure 3B:
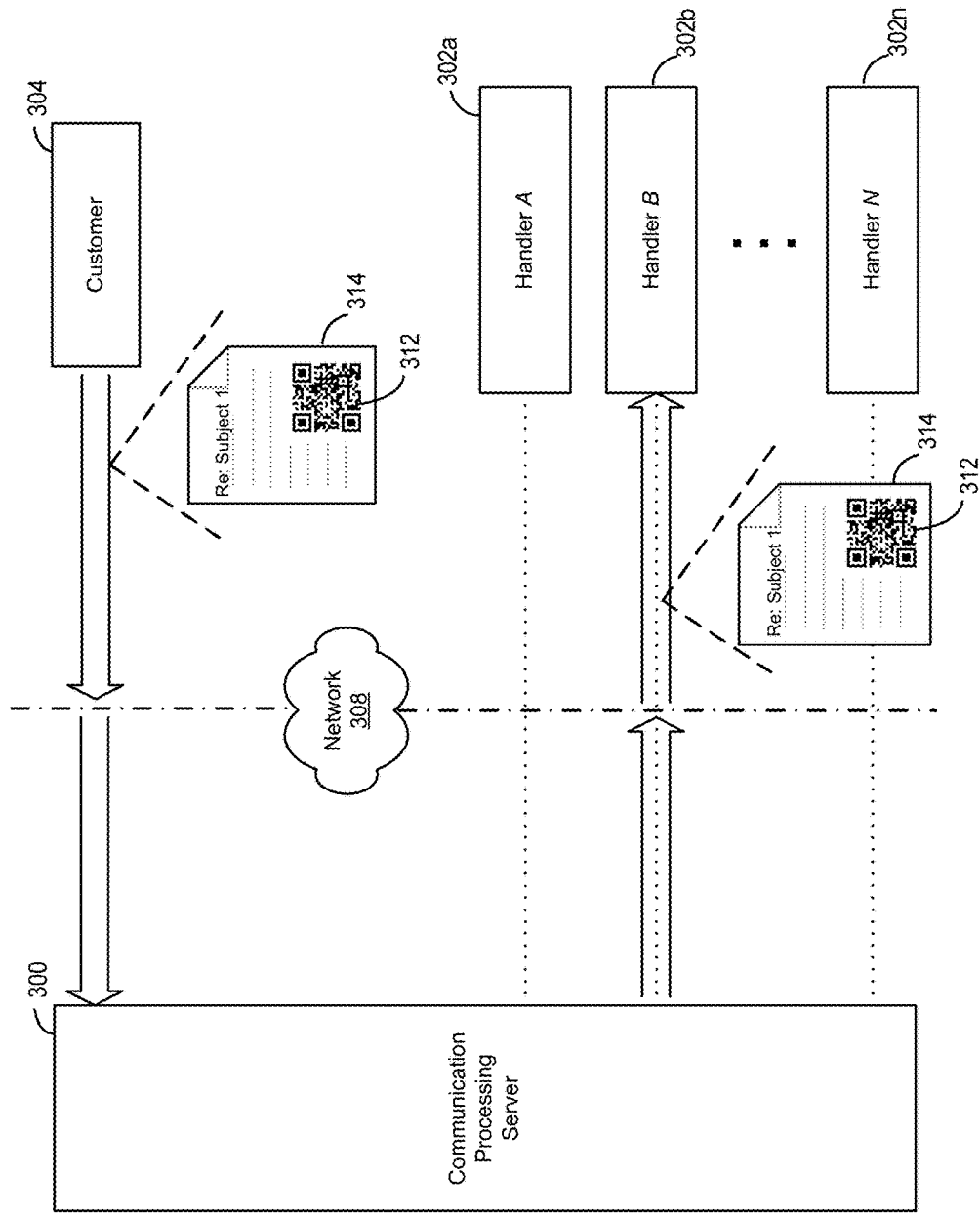
Figure 7:
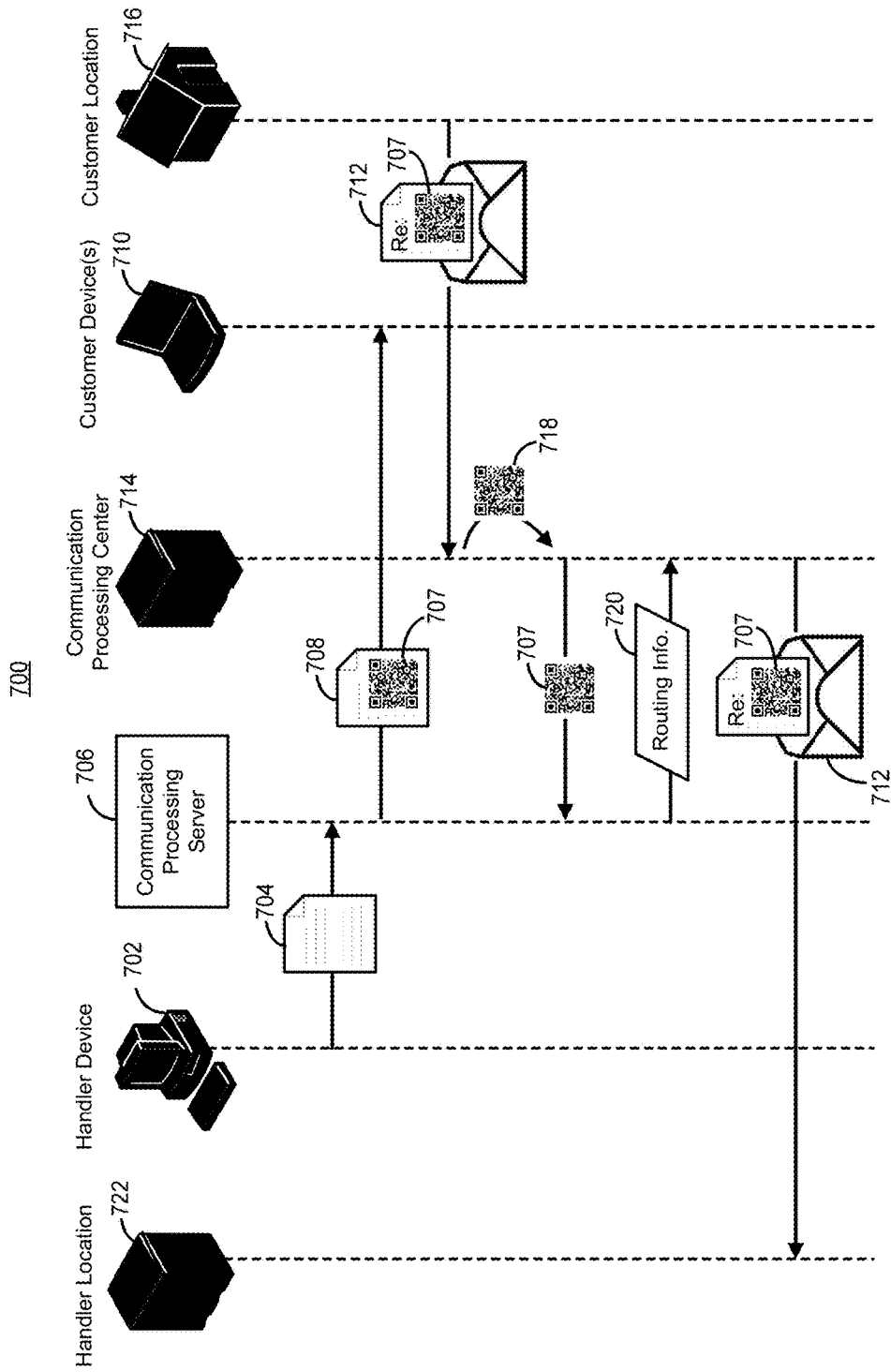
FIG. 7 is an example communication flow in which a communication processing server, such as the communication processing server illustrated in FIG. 1, routes communications of various types.

As depicted in FIG. 3B, the customer 304 may generate a reply 314 to the email 306, which reply 314 may be another email or any other form of correspondence, as discussed further with reference to FIG. 7. For example, the customer 304 may receive the email 306 in an "Inbox" of an email application executing on a computing device. The customer 304 may utilize a "Reply" or "Reply All" function of the email application to generate the reply 314. In such cases, the reply 314 will also include (e.g., in a footer, subject line, or body of the reply 314 email) the symbols or codes 312 included originally in the email 306. The customer 304 may communicate the reply 314 to the communication processing server 300 via the network 308 and any suitable number of email servers (not shown).

Upon receiving the reply 314, or a copy (e.g., scanned or electronic copy) of the reply 314, the communication processing server 300 may decode the symbols or codes 312 to determine how the reply 314 should be routed. In some cases, the communication processing server 300 may utilize one or more QR Code® readers, or other routines, to extract routing related information directly from the symbols or codes 312. In other cases, the communication processing server 300 may extract indices from the symbols or codes 312 and utilize the indices to retrieve routing related information or data from a database.

In the scenario illustrated in FIGS. 3A and 3B, the symbols or codes 312 may encode an identification of the handler 302b, a department of the handler 302b, an insurance claim number representing an insurance claim to which the handler 302b is assigned, etc. In this manner, the communication processing server 300 may determine that the reply 314 should be routed to the handler 302b. The communication processing server 300 may, in some implementations, forward the reply 314 to the handler 302b. However, the communication processing server 300 may also forward the reply 314 along with routing instructions (e.g., an email or location of the handler 302b) to any number of other servers to forward the replay 314 to the handler 302b.

Although FIGS. 3A and 3B illustrate one exchange of an email 306 with a reply 314, the communication processing server 300 may route any number of emails, replies, etc. between the customer and the handler 302b based on the symbols and codes 312. For example, the handler 302b may send a second reply to the customer 304 and the customer 304 may send a third reply to the handler 302b. All of these replies may include the symbols or codes 312. Further, the communication processing server 300 may route copies of communications to multiple parties with a company, organization, etc. based on symbols or codes. For example, if the symbols or codes 312 indicate that the reply 314 should be routed to both the handler 302b and the handler 302a, the communication processing server 300 may route a copy of the reply 314 to both the handler 302b and the handler 302a.

Figure 4:
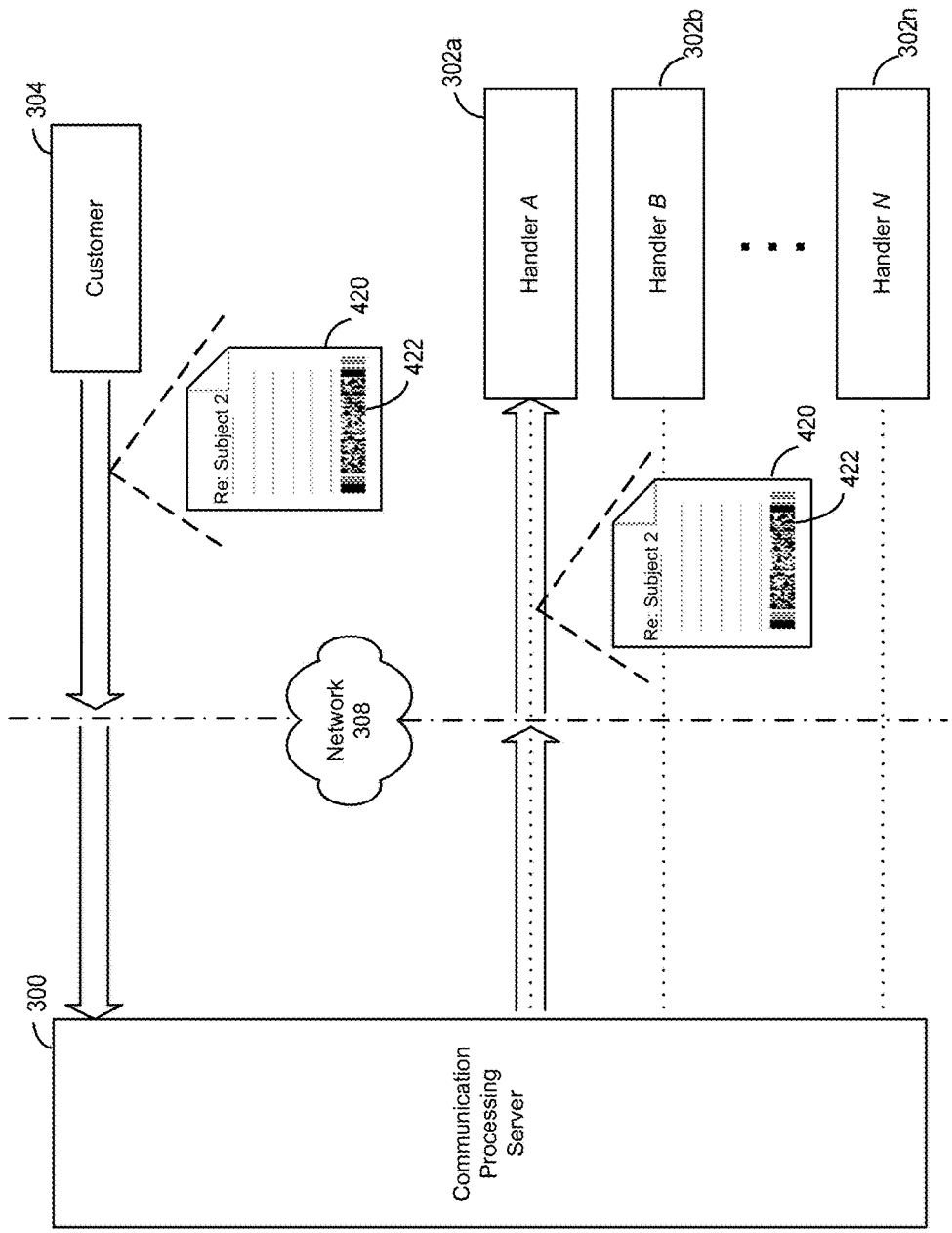
FIG. 4 illustrates scenario in which another communication from the customer illustrated in FIGS. 3A and 3B is routed to another handler.

Generally, the customer 304 may receive and reply to multiple different communications from multiple different parties (e.g., multiple different ones of the handlers 302a-302n) within a company or organization. Each of these different communications may include different embedded symbols or codes such that the communication processing server 300 routes each of the communications to corresponding parties. FIG. 4 illustrates another scenario in which the customer 304 replies (e.g., with a reply 420) to a separate email. The reply 420 includes one or more symbols or codes 422 different from the one or more symbols or codes 312. As such, the communication processing server 300 may route the reply 420 to a different one of the handlers 302a-302n (e.g., the handler 302a) than the handler 302b to which the reply 314 is routed.

Figure 5A:
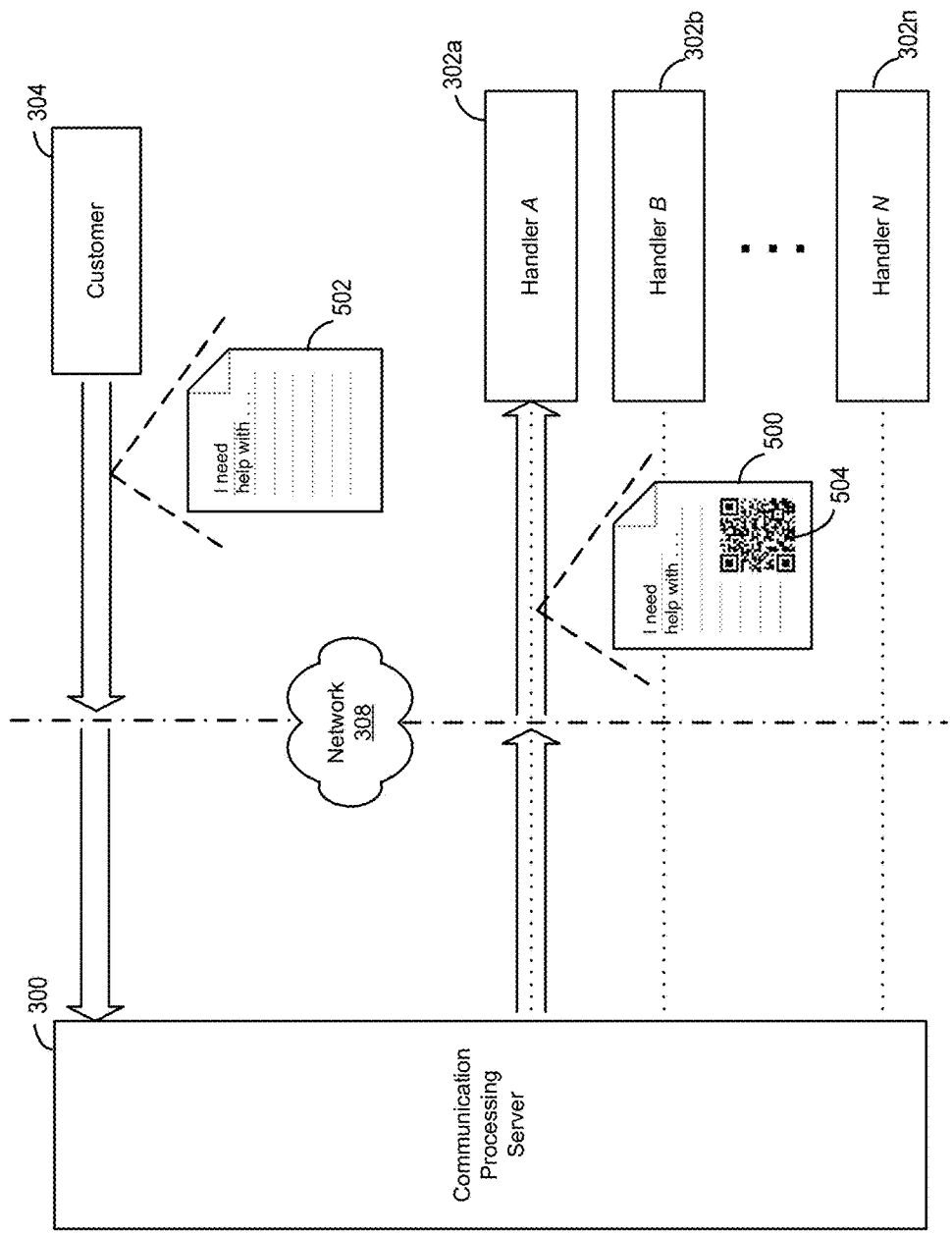
FIGS. 5A and 5B illustrate a scenario in which a communication generated by a customer is routed between the customer and a handler.

The customer 304, as opposed to one of the handlers 302a-302n, may also initiate an exchange of communications that is routed by the communication processing server 300. Referring now to FIG. 5A, the customer 304 may interact with the communication processing server 300 to generate an email 500 to be sent to one or more of the handlers 302a-302n. In one implementation, the customer 304 (e.g., an insurance customer operating a computing device) may interact with one or more web pages generated by the communication processing server 300 to generate the email 500. For example, an insurance customer may access (e.g., via a web browser application) one or more web pages of an insurance company to generate a message to individuals employed by the insurance company regarding an insurance claim. Generally, customers may generate emails, or other suitable forms of communications sent to the communication processing server 300, regarding any customer service related topic, such as buying or selling products or services, technical help with products or services, completing payments for products or services, requesting more information about products and services, etc. In any event, the customer may provide content 502 to the communication processing server 300 to be sent to one or more of the handlers 302a-302n.

When the customer 304 interacts with the communication processing server 300 to generate the email 500, the communication processing server 300 may determine appropriate ones of the handlers 302a-302n to which the email 500 should be forwarded. The communication processing server 300 may base such a determination on certain portions of the content 502 provided by the customer 304, in some implementations. For example, the customer 304 may select one or more fields displayed in web pages, where the fields indicate a topic/subject of the email 500 (payments, technical problems, buying new products or services, etc.), a department to which the message is to be directed (e.g., claims, payments and disbursements, sales, etc.), etc.

In other implementations, the communication processing server 300 may automatically determine an appropriate routing of the email 500 using a text-based analysis of the content 502. For example, the content 502 may simply include a block of text that is to be forwarded to one or more of the handlers 302a-302n. The communication processing server 300 may execute one or more word search, text mining, text analytics, or other text-based analysis algorithms, such as set-theoretic, algebraic, or probabilistic models, to extract information from the block of text, which information indicates the subject or topic of the communication. Upon determining the subject or topic of the communication, the communication processing server 300 may determine appropriate ones of the handlers 302a-302n to which the email 500 should be forwarded.

Figure 5B:
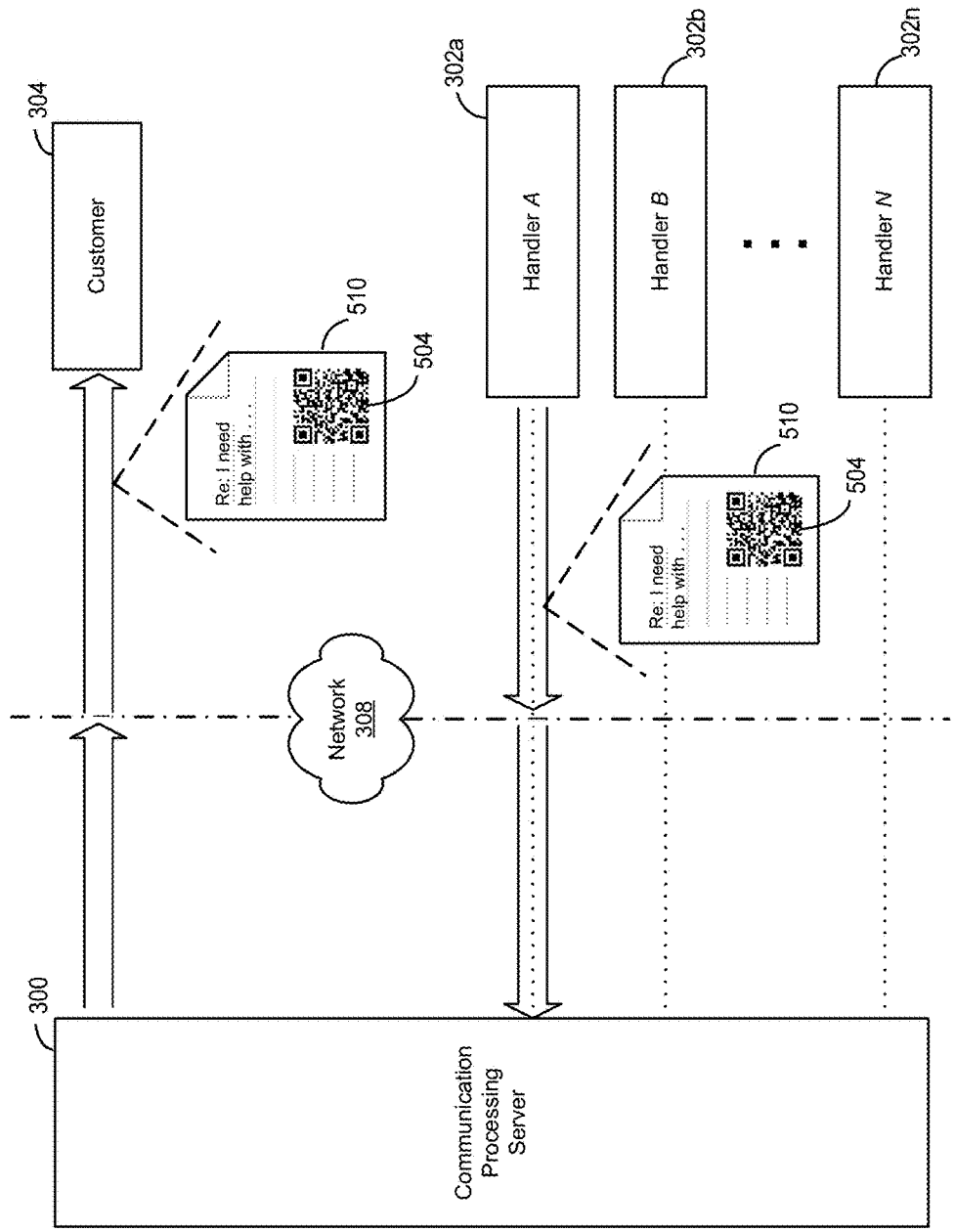

The communication processing server 300 may generate one or more symbols or codes 504 indicating the determined routing to the specific ones of the handlers 302a-302n (e.g., the handler 302a). The communication processing server 300 may then embed the symbols or codes 504 in the email 500 and forward the email 500 to the specific handler 302a. When the handler 302a replies to the email 500 with a reply 510 (as illustrated in FIG. 5B), the reply 510 may include the generated symbols or codes 504. Any subsequent replies between the customer 304 and the handler 302a may be routed by the communication processing server 300 based on the symbols or codes 504.

Figure 6:
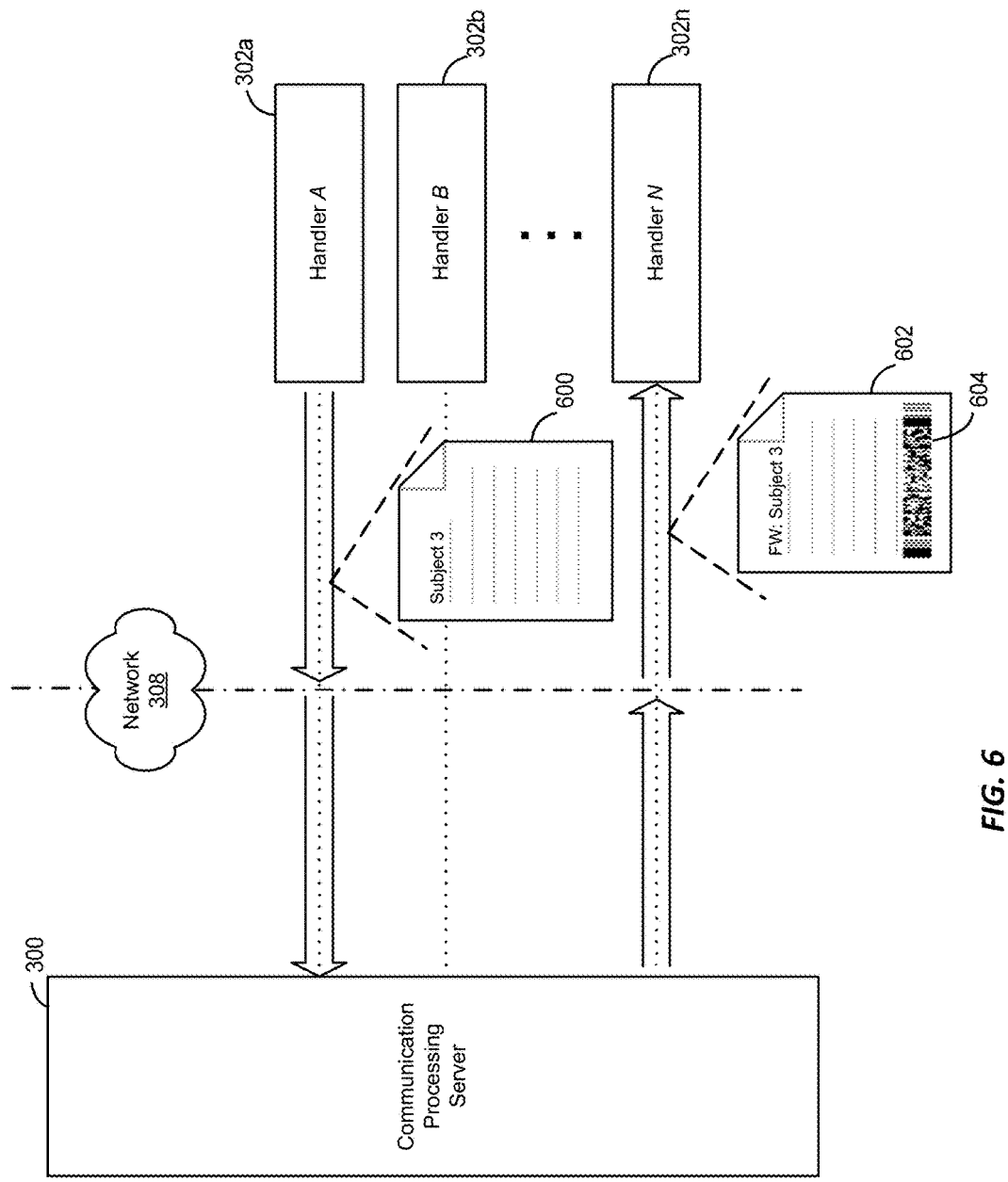
FIG. 6 illustrates a scenario in which a communication generated by a handler is routed between the handler and another handler.

In yet another scenario illustrated in FIG. 6, the communication processing server 300 may generate, embed symbols or codes in, and route communications from one of the handlers 302a-302n to other of the handlers 302a-302n. That is, a company or organization may utilize the communication processing server 300 to generate and route communications between employees of the company or organization (e.g., communications within the company or organization). For example, one of the handlers 302a may interact with the communication processing server 300 and/or other suitable servers (e.g., including transmitting content 600) to generate an email 602 to be sent to another one of the handlers 302*n*. The communication processing server 300 may insert one or more symbols or codes 604 into the email 602, and any further replies or other communications between the handler 302*a* and the handler 302*n* may be routed based on the embedded symbols or codes 604.

Communications and Routing Flows

In some scenarios, communications may be sent to/from customers electronically, but replies to the communications may be sent via physical mail or fax, or vice versa. In such scenarios, communication processing servers may route various types of communications, both electronic and physical, based on associated symbols or codes. In particular, FIG. 7 illustrates an example communication flow 700 in which communications of various types are routed based on symbols or codes embedded in the communications. The communication flow 700 may be implemented in a suitable combination of the computing environment 100 and the mail processing system 200, for example.

A handler device 702, such as a computing device operated by an insurance agent or claim handler, may provide content 704 to a communication processing server 706. The content 704 may include any suitable content that is to be sent to a customer, such as bills, form letters, requests for information, etc. The communication processing server 706 generates and embeds one or more symbols or codes 707 into an electronic message 708 (e.g., an email), including at least portions of the content 704, that is sent to a customer device 710 operated by the customer. The communication processing server 706 and/or other servers (not shown) may send the electronic message 708 to the customer device 710 via any suitable electronic mail protocols, messages displayed within web pages, mobile alerts (e.g., PUSH alerts), etc.

Although the customer may receive the electronic message 708 at the customer device 710, the customer may choose to or be required to respond to the electronic message 708 via physical mail. For example, the electronic message 708 may include various forms, contracts, etc. that need to be physically signed by the customer and mailed back to a company operating the communication processing server 706. Also, a customer may simply choose to print a physical copy of a form or other correspondence to reply to the electronic message 708. Regardless, the customer may send a response 712 to a communication processing center 714 (operated by the same company as the communication processing server 706) from a customer location 716, such as a home of the customer.

In cases in which the response 712 is a printed form originally included in the electronic message 708, the response 712 may include the symbols or codes 707. For example, the response 712 may be a printed and completed insurance form which, when printed (e.g., on an inkjet or laserjet printer), includes printed versions of the symbols or codes 712.

When received by the communication processing center 714, one or more symbol reading devices, such as the symbol reader 210, may scan at least a portion of the response 712 so as to generate an image 718 of the symbols or codes 707. One or more computing devices disposed at the communication processing center 714 may communicate the image 718 of the symbols or codes 707 to the communication processing server 706, and the communication processing server may decode the symbols or codes 707 based on the image 718 to determine appropriate routing information 720 for the response 712.

The routing information 720 may indicate, by way of example, a specific handler location 722 to which the response 712 should be routed. For example, the electronic message 708 and the response 712 may contain information associated with an insurance claim being handled by a certain claim handler located at the handler location 722. In such an example, the symbols or codes 707 may encode an indication of the handler location 722, an office of the handler located at the handler location 722, or a department of the insurance company located at the handler location 722. The communication processing server 706 may generate the routing information 720 upon decoding the symbols or codes 707.

The communication processing server 706 may send the routing information to one or more computing devices or network-connected devices (e.g., mail sorting machines) at the communication processing center 714. One or more employees or machines at the communication processing center 714 may then forward the response 712, a scanned copy of the response 712, or at least some portion of the response 712 to the handler location 722.

Figure 8:
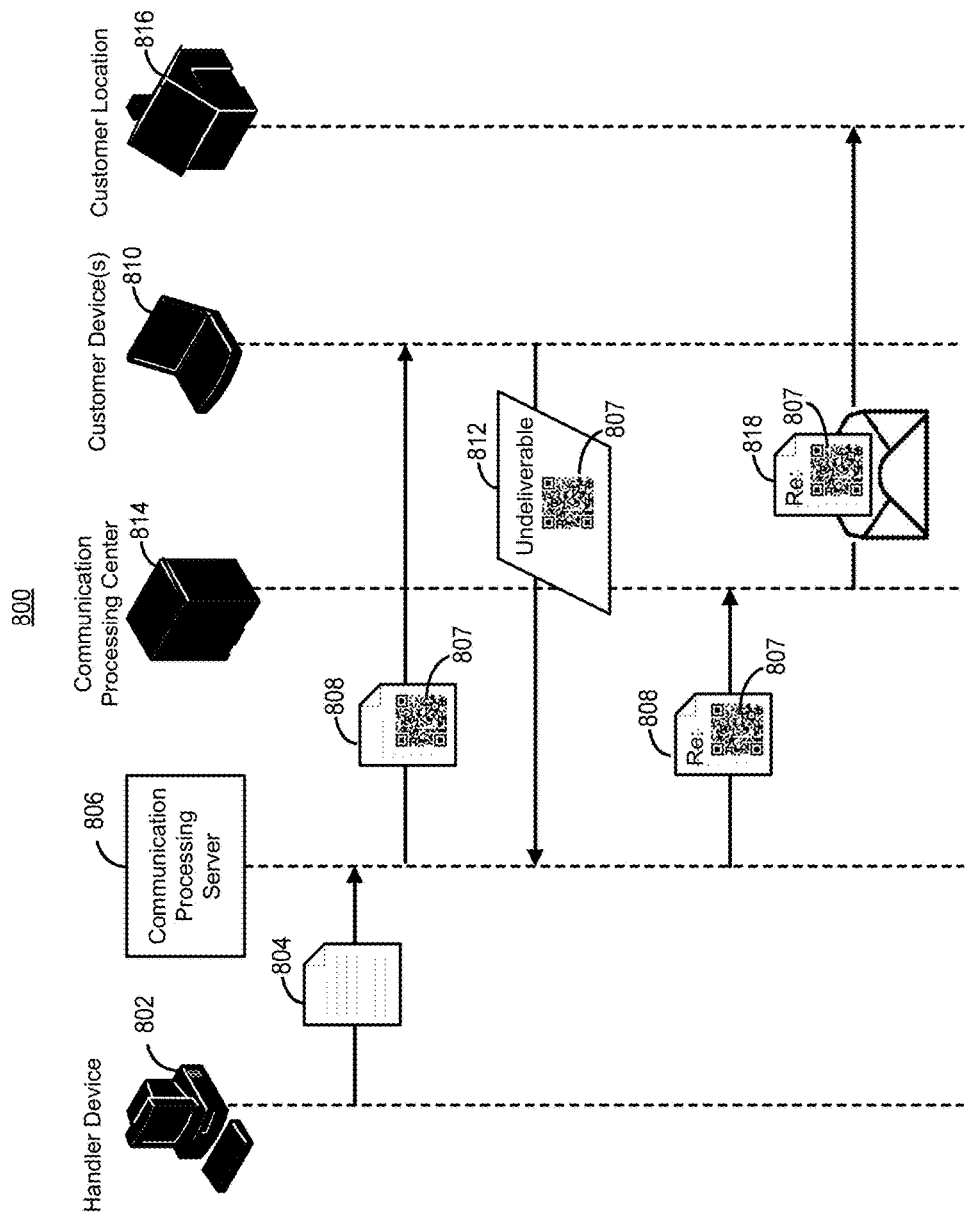
FIG. 8 is an example communication flow in which a communication processing server, such as the communication processing server illustrated in FIG. 1, re-routes an undeliverable communication.

In some other scenarios, a communication sent to a customer via a first communication type (e.g., email) may be undeliverable, and a communication processing server may cause the communication to be sent to the customer via another communication type (e.g., physical mail). FIG. 8 illustrates an example communication flow 800 in which communications of a certain type fail and are re-routed with another communication type. The communication flow 800 may be implemented in a suitable combination of the computing environment 100 and the mail processing system 200, for example.

Similar to the communication flow 700, a handler device 802 may provide content 804 to a communication processing server 806. The communication processing server 806 generates and embeds one or more symbols or codes 807 into an electronic message 808 (e.g., an email), including at least portions of the content 804, that is sent to a customer device 810 operated by the customer. However, in the example communication flow 800 depicted in FIG. 8, the customer device 810 or an email server (not shown) may return data 812 to the communication processing server 806 indicating that the electronic message 808 could not be delivered. For example, an email server (not shown) may implement one or more software applications that indicate a "hard bounce" of the electronic message 808. Generally the data 812 may be returned due to any number of circumstances, such as invalid email addresses, file sizes of email attachments, junk mail filters, etc. In some cases, the data 812 may also include the symbols or codes 807.

Because the electronic message 808 is undeliverable, the communication processing server 806 may cause content, similar to that in the electronic message 808 including the symbols or codes 807, to be sent to the customer in another form of communication. As depicted in FIG. 8, the communication processing server 806 may send an electronic copy of the message 808 to one or more computing devices at a communication processing center 814, which computing devices cause a physical copy 818 of the electronic message 808 to be sent to a customer location 816 via physical mail.

In some implementations, the communication processing server 806 may prioritize communication types based on stored preferences of customers, such as customer preferences 820 stored in the correspondence database 130. For example, a customer may prefer to be contacted via email with all correspondence. However, when sending a communication via email fails (as illustrated in FIG. 8), the communication processing server 806 may attempt to send the communication via physical mail, fax, etc. Generally, a customer may indicate any type of preference for communication, such as preferring physical mail over email, and a company or organization operating the communication processing server 806 may have requirements as to how certain communications are sent to customers. The communication processing server 806 may prioritize types of attempted communications based on these customer preference and business rules.

Although FIG. 8 illustrates an electronic communication being undeliverable, the communication processing server 806 may re-route communications with any suitable communication type based on undeliverable communications utilizing any other communication type. For example, a physical letter may be returned to a communication processing center based on an invalid physical address, and the communication processing server 806 may then attempt to send an electronic copy of the letter via email or fax. Further, communication flows or scenarios may include any types of communications, such as physical mail, emails, faxes, mobile alerts, text messages, etc., with embedded symbols or codes at any suitable stages of an exchange of communications with a customer. For example, a first message from a handler may include a physical letter, a reply to the physical letter may include a fax from a customer, a reply to the fax may include an email from the handler to the customer, etc.

Figure 9:
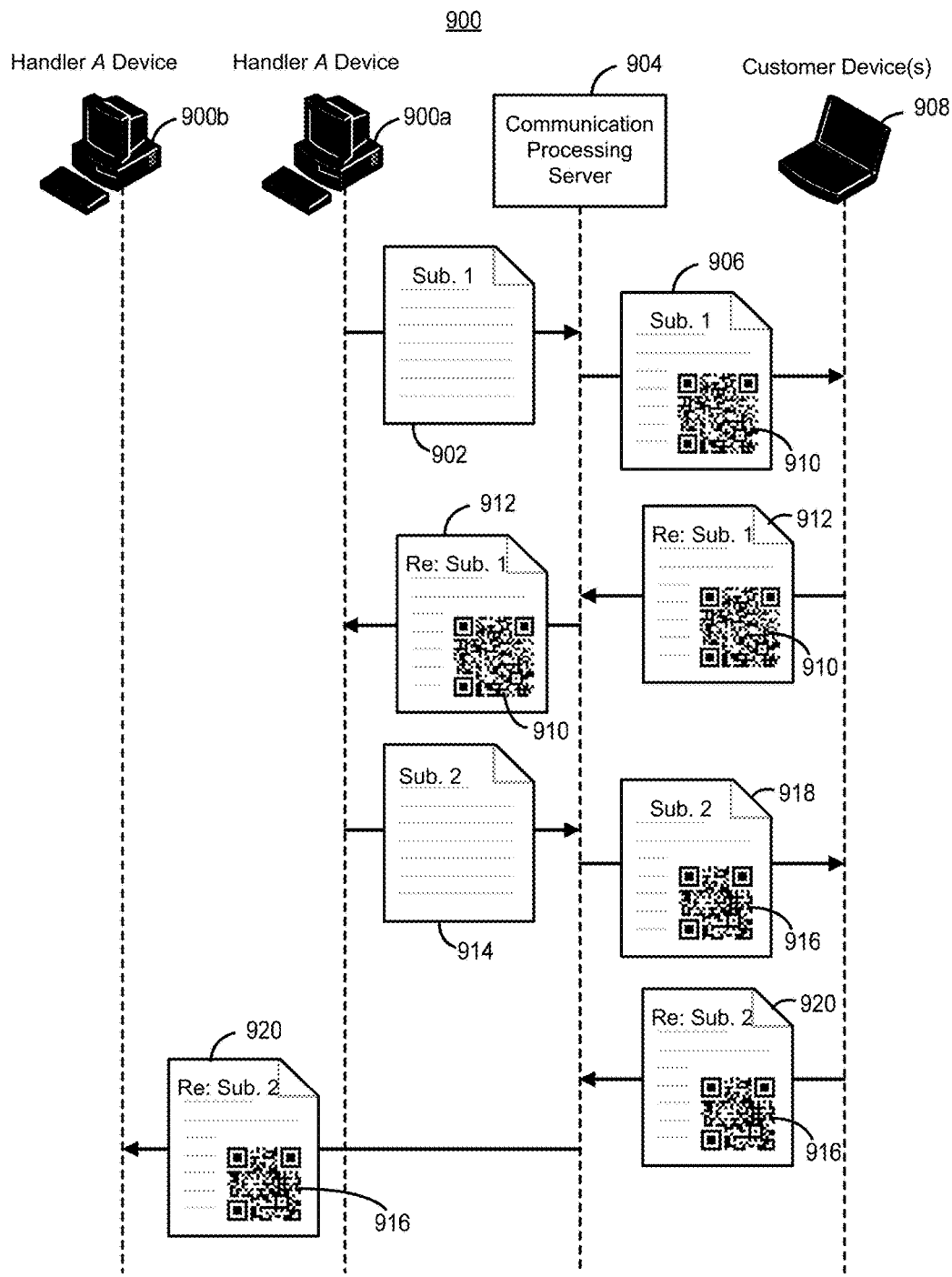
FIG. 9 is an example communication flow in which a communication processing server, such as the communication processing server illustrated in FIG. 1, modifies an embedded symbol or code during a communication exchange.

In addition to routing various types of communications, a communication processing server may, in some implementations, update, replace, or otherwise modify symbols or codes over the course of communication exchanges with a customer. FIG. 9 illustrates an example communication flow 900 in which communications to and from a customer include various embedded symbols or codes over the course of an exchange of the communications. The communication flow 900 may be implemented in a suitable combination of the computing environment 100 and the mail processing system 200, for example.

Similar to the scenario described with reference to FIGS. 3A and 3B, a handler device 900a may provide content 902 to a communication processing server 904. Subsequently, the communication processing server 904 may generate a communication 906 (e.g., email) to be sent to a customer device 908, which communication 906 includes one or more embedded symbols or codes 910. In response to the communication 906, the customer device 908 may send a reply 912 to the communication processing server 904. The communication processing server 904 may route the reply 912 to the handler device 900a based on the symbols or codes 910 included in the reply 912.

The handler 900a may provide different content 914 to the communication processing server 904. The communication processing server 904 may determine that a reply to a communication including the different content 914 should be routed differently than the reply 912, such as to different handlers (e.g., the different handler 900b), different departments of a company, etc. For example, the communication 906 and reply 912 may be directed to a topic of modifying an insurance policy to have new types of insurance coverage, which topic may be handled by a sales department of an insurance company. On the other hand, the content 914 may initiate communications regarding payments for the modified insurance policy, which payments may be handled by a payments/disbursements department of the insurance company. As such, the communication processing server 904 may generate and embed different symbols or codes 916 in a new communication 918 including portions of the content 914, which different symbols or codes 916 indicate a different routing for replies to the new communication 918.

When a reply 920 to the new communication 918 is received by the communication processing server 904, the communication processing server 904 may route the reply 920 differently than the reply 912. In the example communication flow 900, the communication processing server 904 may route the reply 920 to the different handler 900b.

During the course of communications with a customer, communications processing servers may replace or otherwise modify symbols or codes embedded in communications for any number of reasons. For example, when communicating with an insurance company to process an insurance claim, a communication processing server may generate and embed different symbols or codes for each of a variety of communications, such as payments, medical bills, repair bills, estimates, fact gathering forms, etc. occurring over the course of a claim process. In some implementations, handlers, such as the handlers 104a-104n, may indicate to a communication processing server a type of communication (e.g., payment forms) via one or more web browser or email applications, and, in other cases, communication processing servers may detect types of communications based on retrieved form identification numbers (e.g., stored in the forms/templates 134), originating departments within a company, email subject lines, updated claim information (e.g., stored in a database) corresponding to a certain claim number, etc.

By way of example, communication processing servers may also modify or replace symbols or coded embedded in communication exchanges with customers because: certain employees of a company are reassigned within a company, a customer requests a change of a handler (e.g., a change of an insurance agent or claim handler), operators of the communication processing server wish to track communications over time, certain symbols or codes contain errors, certain information related to a communication exchange is updated by a customer or handler, etc. In some implementations, every sent communication and reply processed by a communication processing server may include one or more symbols or codes unique to that sent communication and reply. In other implementations, a communication processing server may only change or replace symbols or codes within communications sent to a customer when certain events occur (e.g., when a payment is made) or when certain conditions are met (e.g., at certain stages of an insurance claim process).

Figure 10:
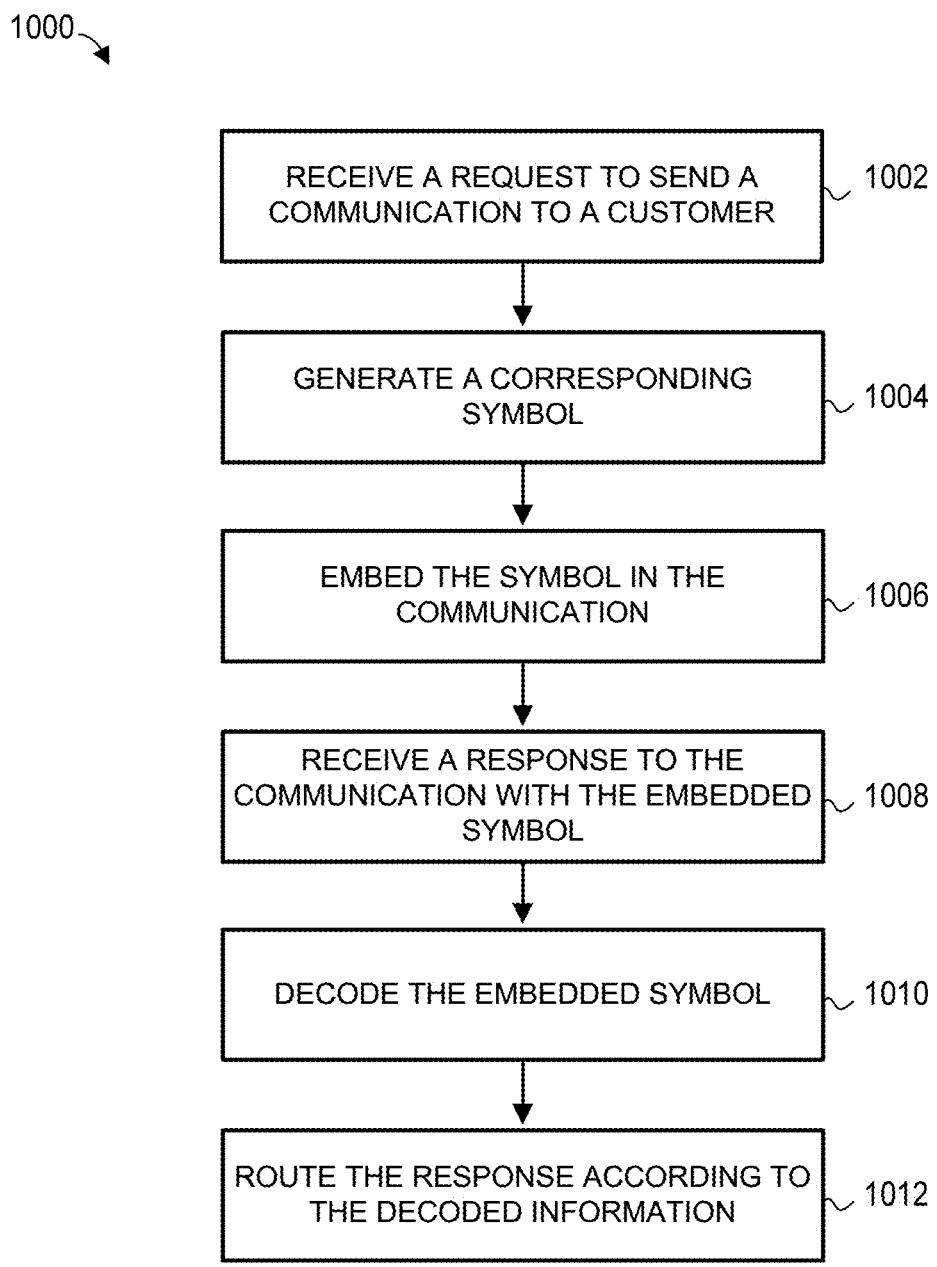
FIG. 10 is a flow diagram of an example method for routing communications based on embedded symbols or codes which can be implemented in the system illustrated in FIG. 1.

FIG. 10 is a flow diagram of an example method 1000 for routing communication based on embedded symbols and/or codes. The method 1000 may be implemented by any one of the communication processing servers 106, 300, 706, 806, or 904, for example.

A request to send a communication to a customer is received (block 1002). For example, one of the handler devices 104a-104n may send a request to the communication processing server 106 to send an email to the customer device(s) 102. The request may include message content (e.g., text and/or image based content), indications of form letters or templates, an email formatted according to any suitable protocol, etc. In some implementations, the request may also include an indication of the originating handler or department of the communication and/or an indication of how a reply to the communication should be routing (e.g., to which handler or department of a company).

Based on the request, one or more symbols or codes are generated to encode routing information corresponding to the communication (block 1004). For example, the communication processing server 106 may generate QR Codes®, PDF417® bar codes, sequences of alphanumeric characters, hidden HTML fields, etc. that encode information. The encoded information may include any suitable information utilized by the communication processing server 106 to route communications. By way of example, the symbols or codes may encode any combination of identifications of certain handlers (e.g., insurance agents), identifications of certain department or divisions of a company, indications of physical locations, email addresses, insurance claim numbers, information about customers (name, insurance policy number, account number, etc.), information about products or services offered by a company or purchased by customers, etc.

The generated symbols or codes are embedded into a communication to be sent to the customer device(s) (block 1006). The communication processing server 106 may insert images of symbols or codes into HTML or rich text format emails, attach images of symbols or codes to emails, insert sequences of alphanumeric characters into subject lines or hidden HTML fields of an email, insert images of symbols or codes into portable digital format (PDF) or other documents that will be printed and mailed to customers, etc.

In some implementations, the communication processing server 106 may embed multiple types of symbols or codes into communication so as to substantially increase to likelihood of a reply to the communication including at least one of the embedded symbols or codes. For example, the communication processing server 106 may embed routing information in a QR Code®, PDF417® barcode, or other code or symbol inserted into an HTML format email. The communication processing server 106 may also embed at least some routing information (e.g., in index into a database) into a unique file name for the QR Code®, PDF417® barcode, or other symbol. In this manner, the communication processing server 106 may determine routing information by either decoding the QR Code® or retrieving routing information in a database based on the unique file name.

In a certain scenario, a customer may receive an HTML format email with an embedded QR Code® having a unique file name. The customer may respond to the HTML format email with a plain text email that does not include the QR Code®. The plain text email may, however, include a text indication of the unique file name of the QR Code®, and, as such, the communication processing server 106 may determine routing information in the absence of the QR Code®. Generally, symbols or codes embedded by a communication processing server may include multiple different types of symbols or codes encoding the same or different information related to routing communications.

Returning to FIG. 10, a response is received from the customer, which response includes at least some of the embedded symbols or codes (block 1008). Upon receiving such a response, the embedded symbols or codes in the response are decoded to determine routing information (block 1010). For example, the communication processing server 106 may determine, based on decoded information from the symbols or codes, a specific routing of the received response to a certain handler (e.g., via email), a certain department or division of a company, etc. The response is then routed according to the decoded information and determined routing information (block 1012).

Because the method 1000 allow a communication processing server to route communications based on embedded symbols, customers of a company utilizing the method 1000 to route communicate may need to remember or know fewer email addresses, physical addresses, etc. to communicate with the company. For example, a customer may send an email with an embedded symbol or code to a general email address (e.g., an easily remembered or well-advertised email address) of a company, and, when the email is received by the company, a communication processing server may appropriately route the email within the company based on the embedded symbol or code.

Additional Considerations

Upon reading this disclosure, those of ordinary skill in the art will appreciate still additional alternative structural and functional designs for system and a method for assessing the performance of particular operators of vehicles or machines. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention. By way of example, and not limitation, the present disclosure contemplates at least the following aspects:

1. A computer-implemented method comprising:

receiving, from a first party via a computer network, an indication that a communication is to be sent from the first party to a second party;

for the communication from the first party to the second party, generating, by one or more processors, a code that encodes an indication of a communication routing between the first party and the second party;

embedding, by the one or more processors, the code into the communication such that the code is sent with the communication from the first party to the second party;

receiving, from the second party via a computer network, a response to the communication, wherein the response to the communication includes the embedded code indicating the communication routing between the first party and the second party;

decoding, by the one or more processors, the embedded code to determine the communication routing between the first party and the second party; and causing, by the one or more processors, the response to the communication to be routed to the first party based on the determined communication routing.

2. The computer-implemented method according to aspect 1, wherein the first party is a customer of a company, wherein the second party is one of a plurality of employees at the company, and wherein the plurality of employees at the company are associated with a plurality of divisions or departments within the company.

3. The computer-implemented method according to preceding aspect, wherein the communication routing includes an indication of at least one of:

(i) the one of the plurality of employees at the company, or (ii) a particular one of the plurality of divisions or departments within the company associated with the one of the plurality of employees.

4. The computer-implemented method according to any one of the preceding aspects, wherein the communication from the first party to the second party is an electronic communication, and wherein the response to the communication is a paper communication sent via physical mail.

5. The computer-implemented method according to the preceding aspect, wherein decoding the embedded code to determine the communication routing between the first party and the second party includes:
receiving, from a scanning device, an image of the embedded code from the paper communication, and
analyzing, by the one or more processors, the image of the embedded code to determine the communication routing between the first party and the second party.

6. The computer-implemented method according to any one of the preceding aspects, wherein the communication from the first party to the second party is a paper communication sent via physical mail, and wherein the response to the communication is an electronic communication.

7. The computer-implemented method according to any one of the preceding aspects, wherein the code includes at least one of a one-dimensional bar code or a two-dimensional bar code.

8. The computer-implemented method according to the preceding aspect, wherein decoding the embedded code to determine the communication routing between the first party and the second party includes reading the data encoded in the at least one of the one-dimensional or the two-dimensional bar code.

9. The computer-implemented method according to any one of the preceding aspects, wherein the communication and the response to the communication correspond to an insurance claim, and wherein the code encodes an indication of an insurance claim number corresponding to the insurance claim.

10. The computer-implemented method according to any one of the preceding aspects, wherein decoding the embedded code to determine the communication routing between the first party and the second party includes:
decoding, by the one or more processors, the code to determine an index into data stored on a data storage device, and
querying, by the one or more processors, the data stored on the data storage device based on the determined index to retrieve data indicative of the communication routing.

11. The computer-implemented method according to any one of the preceding aspects, further comprising:
wherein the code that encodes the indication of a communication routing between the first party and the second party is a first code, wherein the communication from the first party to the second party is a first communication, and wherein the communication routing between the first party and the second party is a first communication routing,
receiving, from a third party via a computer network, an indication that a second communication is to be sent from the third party to the second party, wherein the third party is different from the first party;
for the second communication from the third party to the second party, generating, by one or more processors, a second code that represents a second communication routing between the third party and the second party, wherein the second code is different than the first code, and wherein the second communication routing is different from the first communication routing; and
embedding, by the one or more processors, the second code into the second communication such that the second code is sent with the second communication from the third party to the second party.

12. The computer-implemented method according to the preceding aspect, wherein the first party and the third party are a first employee and a second employee, respectively, of a company associated with a first department and a second department, respectively, of the company, and wherein the first communication routing includes routing to the first department and the second communication routing includes routing to the second department.

13. The computer-implemented method according to either aspect 11 or aspect 12, wherein the first party and the third party are a first employee and a second employee, respectively, of a company operating a first computing device and a second computing device, respectively, and wherein the first communication routing includes routing to the first computing device and the second communication routing includes routing to the second computing device.

14. A computer device comprising:
one or more processors; and
one or more non-transitory memories coupled to the one or more processors,
wherein the one or more non-transitory memories include computer executable instructions stored therein that, when executed by the one or more processors, cause the one or more processors to:
receive, from a first party via a computer network, an indication that a communication is to be sent from the first party to a second party,
for the communication from the first party to the second party, generate a code that encodes an indication of a communication routing between the first party and the second party,
embed the code into the communication such that the code is sent with the communication from the first party to the second party,
receive, from the second party via a computer network, a response to the communication, wherein the response to the communication includes the embedded code indicating the communication routing between the first party and the second party,
decode the embedded code to determine the communication routing between the first party and the second party, and
cause the response to the communication to be routed to the first party based on the determined communication routing.

15. The computer device according to aspect 14, wherein embedding the code into the communication including embedding the code into a hidden HyperText Markup Language (HTML) field of the communication.

16. The computer device according to either aspect 14 or aspect 15, wherein the code includes at least one of a one-dimensional bar code or a two-dimensional bar code.

17. The computer device according to the preceding aspect, wherein the instructions further cause the one or more processors to generate a unique file name corresponding to the at least one of the one-dimensional bar code or the two-dimensional bar code, and wherein embedding the code into the communication includes embedding the at least one of the one-dimensional bar code or the two-dimensional bar code named with the unique file name into the email.

18. The computer device according to any one of aspects 14 to 17, wherein the communication routing indicates an electronic communication routing to one or more devices operated by the first party.

19. The computer device according to any one of aspects 14 to 18, wherein the communication routing indicates a physical communication routing to one or more physical locations corresponding to the first party.

20. The computer device according to any one of aspects 14 to 19, wherein the communication routing indicates an electronic communication routing to one or more devices operated by the first party and a physical communication routing to one or more physical locations corresponding to the first party.

We claim:

1. A computer-implemented method of efficiently and correctly routing electronic communications between a first party and a second party in a distributed computing system that includes a plurality of servers, the computer-implemented method comprising:

receiving, at the distributed computing system and from a computing device of a first party via a computer network, an indication that an electronic communication is to be sent from the first party to a second party, wherein the computing device of the first party is remote from the distributed computing system, and wherein the computer network includes the Internet;

for the electronic communication from the first party to the second party, generating, by the distributed computing system, a code that encodes an index into data stored on a data storage device, wherein data stored at the index on the data storage device specifies a communication routing between the first party and the second party;

embedding, by the distributed computing system, the code into the electronic communication, wherein embedding the code into the electronic communication includes adding the code to a hidden Hypertext Markup Language (HTML) field of the electronic communication;

causing, by the distributed computing system, the electronic communication with the embedded code to be routed to a computing device of the second party via the computer network, wherein the computing device of the second party is remote from the distributed computing system;

receiving, at the distributed computing system and from the computing device of the second party via the computer network, a response to the electronic communication, wherein the response to the electronic communication includes the code that encodes the index into the data stored on the data storage device;

decoding, by the distributed computing system, the code included in the response to the electronic communication to determine the index into the data stored on the data storage device;

querying, by the distributed computing system, the data stored on the data storage device based on the determined index to retrieve the data stored at the index on the data storage device;

analyzing, by the distributed computing system, the data stored at the index on the data storage device to determine the communication routing; and causing, by the distributed computing system, the response to the electronic communication to be routed to the computing device of the first party based on the communication routing, at least by analyzing the data stored at the index on the data storage device to determine a preferred format of the response, identifying that the response is in a first format, different than the preferred format, and converting the response from the first format into a converted response in the preferred format.

2. The computer-implemented method of claim 1, wherein the second party is a customer of a company, wherein the first party is one of a plurality of employees at a company, and wherein the plurality of employees at the company are associated with a plurality of divisions or departments within the company.

3. The computer-implemented method of claim 2, wherein the communication routing includes an indication of at least one of:

(i) the one of the plurality of employees at the company, or (ii) a particular one of the plurality of divisions or departments within the company associated with the one of the plurality of employees.

4. The computer-implemented method of claim 1, wherein the electronic communication and the response to the electronic communication correspond to an insurance claim, and wherein the code encodes an indication of an insurance claim number corresponding to the insurance claim.

5. A distributed computing system comprising a plurality of servers, the distributed computing system being configured to perform a method that includes:

receiving, from a computing device of a first party via a computer network, an indication that an electronic communication is to be sent from the first party to a second party, wherein the computing device of the first party is remote from the one or more servers, and wherein the computer network includes the Internet, for the communication from the first party to the second party, generating a code that encodes an index into data stored on a data storage device, wherein data stored at the index on the data storage device specifies a communication routing between the first party and the second party, embedding the code into the electronic communication, at least by adding the code to a hidden Hypertext Markup Language (HTML) field of the electronic communication, causing the electronic communication with the embedded code to be routed to a computing device of the second party via the computer network, wherein the computing device of the second party is remote from the one or more servers, receiving, from the computing device of the second party via the computer network, a response to the electronic communication, wherein the response to the electronic communication includes the code that encodes the index into the data stored on the data storage device, decoding the code included in the response to the electronic communication to determine the index into the data stored on the data storage device, querying the data stored on the data storage device based on the determined index to retrieve the data stored at the index on the data storage device analyzing the data stored at the index on the data storage device to determine the communication routing, and causing the response to the electronic communication to be routed to the computing device of the first party based on the communication routing, at least by analyzing the data stored at the index of the data storage device to determine a preferred format of the response,
identifying that the response is in a first format, different from the preferred format, and
converting the response from the first format into a converted response in the preferred format.

\* \* \* \* \*